April 10, 1928.
J. J. McCARTHY
1,666,019
POTATO CHIP MACHINE
Filed July 19, 1927
2 Sheets-Sheet 1
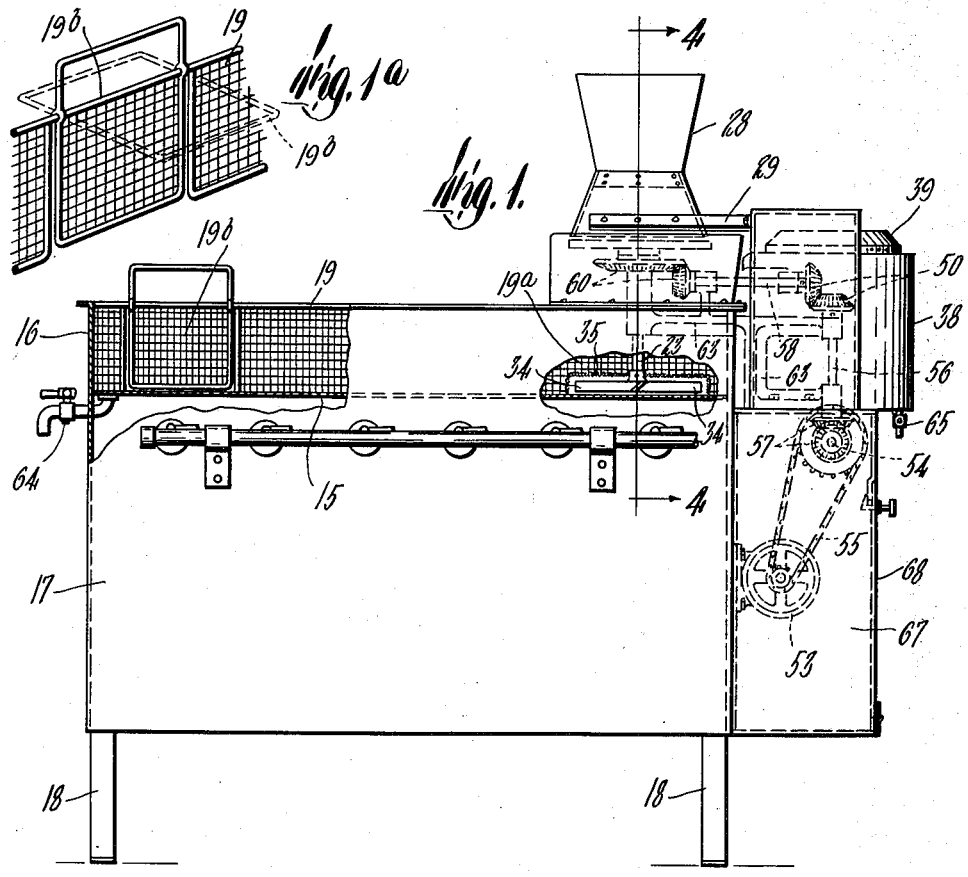
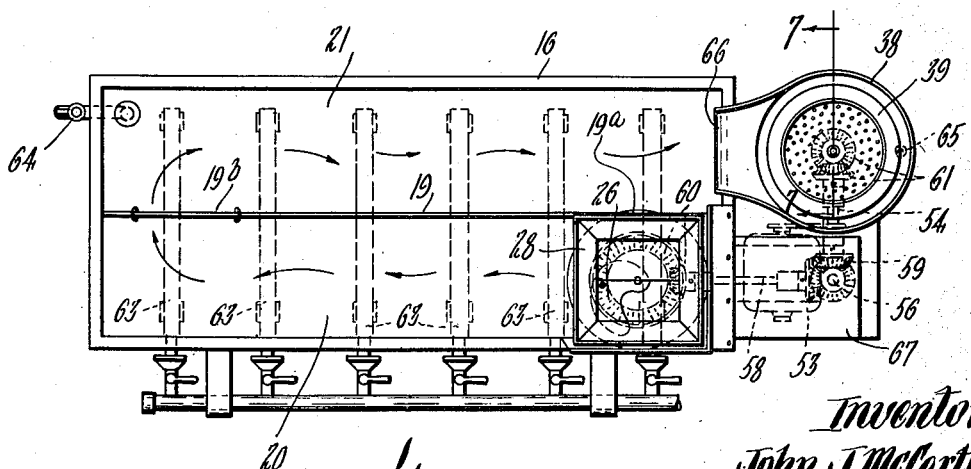
Inventor:
John J. McCarthy,
by Wright Brown Quinby May
attys.

April 10, 1928.
J. J. McCARTHY
POTATO CHIP MACHINE
Filed July 19, 1927
1,666,019
2 Sheets-Sheet 2
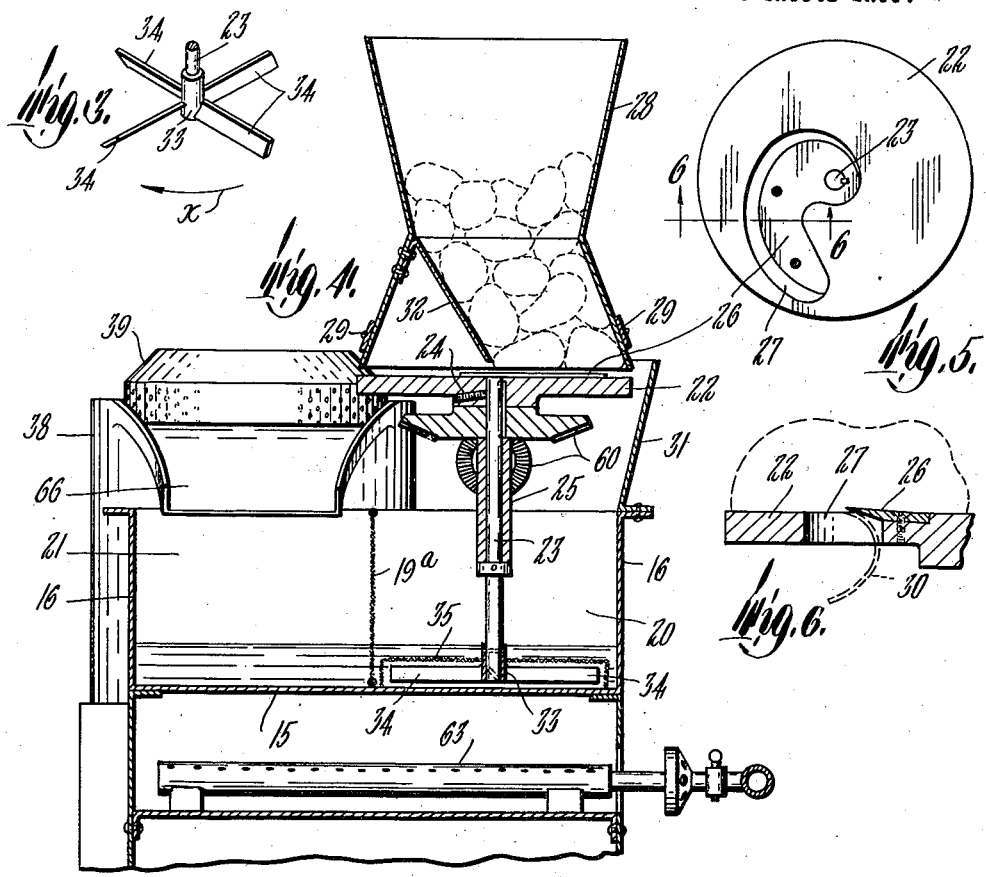
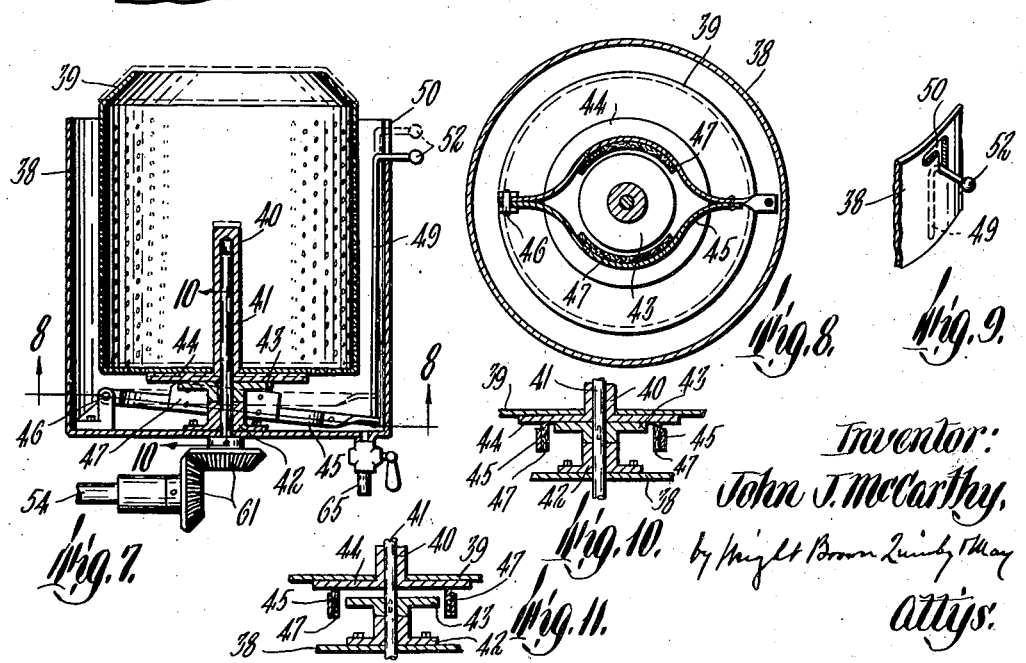
Inventor:
John J. McCarthy,
by Wight Brown Quinby May
attys.

Patented Apr. 10, 1928.

1,666,019

UNITED STATES PATENT OFFICE.

JOHN J. McCARTHY, OF MIDDLEBORO, MASSACHUSETTS, ASSIGNOR TO COLONIAL BRASS COMPANY, OF MIDDLEBORO, MASSACHUSETTS, A CORPORATION OF MASSACHUSETTS.

POTATO-CHIP MACHINE.

Application filed July 19, 1927. Serial No. 206,810.

This invention relates to a machine for slicing potatoes and cooking the same in hot oil to produce potato chips.

One object of the invention is to provide a potato-chip machine of simple and durable and compact construction, adapted to be operated with a relatively small quantity of oil, and at the same time ensure a relatively large output of chips.

Another object is to provide improved means for slicing raw potatoes, dropping the same into the cooking oil, and causing a forced circulation of the oil into which the slices are dropped.

Another object is to provide improved means for preventing the mixture of raw or partly cooked slices with completely cooked chips.

Another object is to provide improved means for centrifugally extracting surplus oil from the cooked chips.

Other objects will be apparent from the following description.

Of the accompanying drawings forming a part of this specification,—

Figure 1 is a side view of a potato-chip machine embodying the invention, portions of the tank being shown in section.

Figure 1ª is a fragmentary perspective view, showing a portion of the partition hereinafter described.

Figure 2 is a top plan view.

Figure 3 shows in perspective the oil propeller hereinafter described.

Figure 4 is a section on line 4—4 of Figure 1.

Figure 5 is a top plan view of the slicer hereinafter described.

Figure 6 is a section on line 6—6 of Figure 5.

Figure 7 is a section on line 7—7 of Figure 2.

Figure 8 is a section on line 8—8 of Figure 7.

Figure 9 shows in perspective details shown by Figure 7.

Figure 10 is a fragmentary section on line 10—10 of Figure 7.

Figure 11 is a view similar to Figure 10, showing a different adjustment.

In the drawings, 15 designates the horizontal bottom, and 16 the upstanding marginal curb of an open tank or pan, surmounting a supporting frame which includes a casing portion 17, and legs 18. A longitudinal partition, designated as a whole by 19, subdivides the tank into a flow passage 20, and a return passage 21. The partition is constructed so that said passages communicate with each other at their opposite ends, to permit a continuous circulation of a body of hot cooking oil in the tank, the circulation being indicated by the arrows in Figure 2.

Located above one end of the flow passage 20 is a slicer, adapted to deliver potato slices to the flow passage, and including a horizontal disk 22, attached as by a set screw 24 (Figure 4) to the upper end of a vertical shaft 23, journaled in a fixed bearing 25, and a knife 26, fixed to the upper side of the head, its cutting edge overhanging a throat 27 (Figures 5 and 6) in the head. A hopper 28 is supported, as by fixed arms 29, above the head 22, the latter forming a horizontal rotating bottom or bed on which potatoes in the hopper rest. The bed and knife are horizontally rotated by the shaft 23, and the cutting edge of the knife projects sufficiently above the head to detach a slice 30 from a potato resting on the head. An extension 31 (Figure 4) of the curb 16 prevents the slices from flying outward when dropping. The hopper 28 is provided with an internal inclined guide plate 32, which maintains the potatoes in the hopper at one side of the axis of the shaft 23.

Fixed to the lower end of the shaft 23 is an oil propeller, which is horizontally rotatable in the flow passage 20, in close proximity to the bottom 15 of the tank, so that the propeller is submerged in a body of oil of operative depth in the tank. The propeller is preferably formed as shown by Figure 3, and includes a hub 33, fixed to the shaft 23, and narrow blades 34, radiating from the hub, and inclined crosswise, as indicated by Figure 3, relative to the direction of rotation indicated by the arrow $x$, so that the rotation of the propeller by the shaft causes the described circulation of the oil. The upper edges of the blades 34 are in a horizontal plane below and spaced from the surface of a body of oil, of operative depth, in the tank, as shown by Figure 4, so that the blades cannot scatter the surface oil.

It will be seen that the propeller, horizontally rotated in close proximity to the bottom of the tank, and having a limited upward projection from said bottom, is adapted to effectively circulate a shallow body of oil, so that the expense for oil is reduced to a minimum.

To prevent direct contact of the slices with the propeller and breakage of the slices thereby, I secure to the tank bottom a foraminous cage 35 (Figure 1).

The partition 19 is provided at the end adjacent the propeller with a fixed foraminous portion 19ª which permits the described circulation of oil and prevents cooked chips from being carried by the return current of oil into the flow passage. The end portion of the return passage 21, bounded in part by the foraminous portion 19ª is therefore a dead end in which cooked chips accumulate, to be removed as hereinafter described.

The opposite end portion of the partition 19 is preferably formed by a swinging foraminous gate 19ᵇ (Figures 1 and 1ª), which is normally in the closed position shown by full lines in Figure 1ª, and prevents chips partly cooked in the flow passage 20 from being carried by the oil into the return passage. When the gate is employed, the machine may be operated by closing the gate, as indicated by Figure 2, until a batch of chips partly cooked in the flow passage, is accumulated therein, and then opening the gate, as indicated by Figure 1ª, to allow the partly cooked chips to enter the return passage 21, wherein they are fully cooked, the gate being then again closed until the accumulation of another batch of the partly cooked chips in the flow passage. By operating the machine in this manner, I prevent the possibility of mixing the partly cooked with the fully cooked chips. It is obvious, however, that if this mode of operation is not desired, the gate may be omitted, the partition being continuously open at the portion here shown as occupied by the gate.

The completely cooked chips accumulating at the dead end of the return passage 21, may be manually removed by a scoop, and surplus oil may be separated therefrom by a centrifugal extractor located adjacent the dead end. Said extractor in this instance, includes a casing 38, fixed to one end of the tank, a rotary foraminous basket 39 in the casing, means for rapidly rotating the basket, and means for starting and stopping the basket, the arrangement being such that chips scooped from the dead end of the return passage 21 may be conveniently deposited in the basket for the centrifugal extraction of the surplus oil therefrom. The close proximity of the extractor to the dead end of the return passage enables the chips to be treated by the extractor while hot, so that they freely yield the surplus oil.

The basket is provided with a bearing 40, for a vertical spindle 41, journaled in a bearing 42, on the bottom of the casing 38. To the spindle is fixed a driving friction disc 43. The basket is vertically movable on the spindle, and to its bottom is fixed a driven friction disc 44, held by the weight of the basket and its contents in frictional engagement with the driving disc 43, so that the basket is rotated by the spindle through the friction clutch formed by said discs. To stop the rotation of the basket, I provide a vertically movable lever 45, pivoted at 46 to an ear on the bottom of the casing 38, and having outwardly bowed portions, to which are attached bowed brake shoes 47, preferably of leather, arranged to bear on the under side of the driven disc 44. The diameter of this disc is greater than that of the driving disc 43, and the brake shoes 47 are movable across the periphery of the driving disc into contact with the under side of the driven disc 44. When the lever is depressed, as shown by full lines in Figure 7, and by Figure 10, the driven disc is in contact with the driving disc. When the lever is raised, as shown by dotted lines in Figure 7, and by Figure 11, the brake shoes 47 raise the driven disc 44 and the basket, and at the same time stop the rotation of the basket. The lever may be releasably supported in the raised position by the engagement of a rod 49, connected with the free end of the lever, with an angular slot 50 in the casing 38. The rod has a bent handle 52, extending through the slot. When the lever is depressed, the handle is in the lower end of the angular slot, as shown by Figure 9. When the rod is raised, it raises the lever, and is moved into the upper portion of the slot to confine the lever in a raised position.

The slicer and propeller-operating shaft 23 and the spindle 41 may be simultaneously driven by means provided for that purpose including, in this instance, a motor 53, a horizontal shaft 54, driven by the motor through connections including a sprocket chain 55, a vertical shaft 56, connected by bevel gears 57 with the shaft 54, a horizontal shaft 58, connected by bevel gears 59 with the shaft 56, and by bevel gears 60 with the slicer and propeller-operating shaft 23, and bevel gears 61 (Figure 7) connecting the shaft 54 with the spindle 41. The motor 53 may be fixed to one end of the casing portion 17, and the bearings of the several shafts may constitute portions of a frame 63, indicated by dotted lines in Figure 1.

The motor, the shaft 23, the slicer and the oil propeller fixed to said shaft, and the described connections between the shaft 23 and the motor, constitute a combined slicing and oil-forcing mechanism, adapted to deliver potato slices to the flow passage and cause a circulation of oil in the flow and return passages. The motor, the shaft 23, the sleeve and the oil propeller, the spindle 41, the basket 39, the frictional driving connections between the spindle and the basket, and the described connections between the shaft 23, the spindle 41, and the motor, constitute a combined slicing, oil-forcing and oil-extracting mechanism, adapted to deliver potato chips to the flow passage, cause a circulation of oil in the flow and return passages, and centrifugally extract surplus oil from chips transferred from the dead end of the return passage.

The tank may be heated by gas burners 63, located in the casing extension 17, under the bottom of the tank. Oil may be drained from the tank through a cock 64, and from the basket casing 38, through a cock 65. The casing 38 may be provided with a spout 66, arranged to deliver oil thrown into the upper portion of said casing, into the return passage 21.

The motor may be enclosed in a casing 67, provided with an opening closed by a removable cover 68, the motor casing being fixed to one end of the casing portion 17.

The oblong rectangular form of the tank 16, and the longitudinally extending partition 19 therein, form flow and return passages extending from end to end of the tank, the passages having inner ends located side by side at one end of the tank, and outer ends located side by side at the opposite ends of the tank. The oil-circulating propeller composed of the horizontal radial blades 34, horizontally movable in close proximity to the bottom of the flow passage 20, and driven by the vertical shaft 23, which is journaled in a bearing above the inner end of the flow passage, is adapted to be entirely submerged below the surface of a body of oil in the tank, the depth of which is sufficient to cover the propeller and the cage 35. A relatively shallow body of oil may, therefore, be employed, said body having a surface coextensive in area with the tank, and adapted at all points to float and cook slices dropped into the inner end of the flow passage, there being no interruption of said surface by the propeller. A sufficient area of slice-floating and cooking surface is therefore provided in a tank of smaller horizontal area than would be necessary, if the propeller were on a horizontal axis, and caused to partly project above and interrupt said surface. Moreover, the entire submergence of the propeller prevents the scattering of the oil thereby, and the cooling of the oil by the action of the propeller, no oil being raised above the surface by the propeller, and allowed to fall back into the body. The cage 35, having a horizontal top arranged to be interposed between the propeller and a slice-floating portion of the oil surface, prevents contact of dropping slices with the propeller, without interrupting the continuity of said surface.

The motor 53, fixed to the tank outside the inner end thereof, the vertical spindle 41, journaled in a bearing 42, outside the tank, and adjacent the inner end of the return passage 21, and the described torque-transmitting connections between the motor, the spindle 41, and the vertical shaft 23, carrying the slicer and the propeller, constitute a driving mechanism carried wholly by the tank, and adapted to simultaneously operate the slicer and the propeller, and at the same time, the basket 39 of a centrifugal extractor located in close proximity to the inner end of the return passage 21, and connected, as described, with the spindle. Said mechanism is a part of a potato-chip machine which may be manufactured, shipped, and installed as a unit, and is of such compact form that it may be conveniently transported and quickly installed at the place where it is to be used.

I claim:

1. A potato chip machine comprising a tank having a partition subdividing it into a flow passage and a return passage, said passages communicating with each other at their opposite ends so that a continuous circulation of oil is permitted through the passages, and a combined slicing and oil-forcing mechanism adapted to deliver slices to the flow passage and cause a circulation of oil in the flow and return passages, said mechanism including a vertical driven shaft journalled in a fixed bearing and projecting into one end of the flow passage, a fixed hopper above the shaft, a slicer composed of a horizontal head fixed to the upper end of the shaft, and a knife fixed to the head and revoluble horizontally by the shaft across the bottom of the hopper, and an oil propeller fixed to the lower end of the shaft and revoluble horizontally thereby in close proximity to the bottom of the tank, so that the propeller is submerged in a body of oil of operative depth, the propeller being formed to cause a continuous circulation of oil through said passages.

2. A potato chip machine comprising a tank having a partition subdividing it into a flow passage and a return passage, said partition having foraminous end portions permitting a continuous circulation of oil through said passages, one of said foraminous portions being a gate normally closed to prevent movement of chips through the partition and adapted to be opened to permit such movement, while the opposite foraminous portion is fixed so that the return conduit has a dead end in which chips may accumulate, slicing means adapted to drop potato slices into the flow passage, and an oil propeller located in the flow passage and formed and arranged to cause a continuous circulation of oil through said passages, the arrangement being such that a batch of chips may be partly cooked in the flow passage while the gate is closed, carried by the oil into the return passage when the gate is opened, and accumulated in the dead end of the return passage for removal.

3. A potato-chip machine comprising a horizontal oblong tank having a longitudinal partition subdividing it into a flow passage and a return passage, said passages extending from end to end of the tank, so that they have inner and outer ends located side by side, said ends communicating with each other to permit a continuous circulation of oil, oil-circulating means including a vertical driven shaft journaled in a bearing above the inner end of the flow passage, and an oil-circulating propeller fixed to the lower end of said shaft, and having horizontal radial blades horizontally movable in close proximity to the bottom of the flow passage, and a foraminous propeller-enclosing cage fixed to the bottom of the flow passage at the inner end thereof, and having a horizontal top arranged to be interposed between the propeller and the slice-floating surface of a body of oil, of operative depth in the tank, so that the cage, without interrupting said surface, prevents contact of dropping and floating slices with the propeller.

4. A potato-chip machine comprising a horizontal oblong tank having a longitudinal partition subdividing it into a flow and a return passage, said passages extending from end to end of the tank and having inner and outer ends located side-by-side and communicating with each other to permit a continuous circulation of oil, a vertical shaft journaled in a fixed bearing above the inner end of the flow passage, a slicer composed of a horizontal head, fixed to the upper end of the shaft, and a knife fixed to the head at one side of the shaft, so that the knife is revoluble horizontally by the shaft, an oil propeller fixed to the lower end of the shaft, and having horizontal radial blades, a motor fixed to the tank outside the inner end thereof, a vertical spindle journaled in a bearing outside the tank and adjacent the inner end of the return passage, and torque-transmitting connections between the motor, the vertical shaft, and the vertical spindle, whereby the shaft, the slicer, the propeller, and a centrifugal extractor connected with the spindle, may be simultaneously operated.

In testimony whereof I have affixed my signature.

JOHN J. McCARTHY.